United States Patent
Flener et al.

(10) Patent No.: US 9,988,184 B2
(45) Date of Patent: Jun. 5, 2018

(54) METHOD OF MANUFACTURING A COMPOSITE INSERT BY MOLDING

(71) Applicant: Henkel AG & Co. KGaA, Duesseldorf (DE)

(72) Inventors: Michael J. Flener, Pleasant Ridge, MI (US); Martin Hornung, Rochester Hills, MI (US); Josef Hudina, Ketsch (DE); Gregory A. Krueger, Chisago City, MN (US)

(73) Assignee: Henkel AG & Co. KGaA, Duessseldorf (DE)

( * ) Notice: Subject to any disclaimer, the term of this patent is extended or adjusted under 35 U.S.C. 154(b) by 14 days.

(21) Appl. No.: 14/560,377

(22) Filed: Dec. 4, 2014

(65) Prior Publication Data
US 2015/0083739 A1 Mar. 26, 2015

Related U.S. Application Data

(63) Continuation of application No. PCT/US2013/048526, filed on Jun. 28, 2013.
(Continued)

(51) Int. Cl.
*B65D 25/02* (2006.01)
*B29C 33/40* (2006.01)
(Continued)

(52) U.S. Cl.
CPC ............. *B65D 25/02* (2013.01); *B29C 33/38* (2013.01); *B29C 33/40* (2013.01); *B29C 39/10* (2013.01);
(Continued)

(58) Field of Classification Search
CPC ....... B65D 25/02; B29C 39/10; B29C 67/246; B29C 45/14; B29C 33/38; B29C 33/40;
(Continued)

(56) References Cited

U.S. PATENT DOCUMENTS 4,921,205 A * 5/1990 Drew, Jr. ................ B29C 39/26
249/134
6,428,729 B1 8/2002 Bhatt et al.
(Continued)

FOREIGN PATENT DOCUMENTS

CN 1310084 A 8/2001
CN 101495285 A 7/2009
(Continued)

OTHER PUBLICATIONS

Internet article, "Low Pressure Molding" by Cavist Manufacturing, Reno, Nevada, Copyright 2015, 1 page.
(Continued)

*Primary Examiner* — Ryan J Walters
(74) *Attorney, Agent, or Firm* — Mary K. Cameron

(57) ABSTRACT

A method of manufacturing a composite insert includes forming a polymer mold from a polymer sheet which may have a glass transition temperature of 70 to 160° C., the polymer mold either includes a cavity or may form a cavity disposed between the polymer mold and the carrier. The method proceeds by depositing a liquid reactive composite insert composition, which may be a two-component composition including a first part comprised of an isocyanate-epoxy blend and a second part comprised of an alcohol-epoxy blend, into the cavity under low pressure conditions of 0-10 bar and low temperature conditions of 15-100° C. The composition is then allowed to become dimensionally stable either within the polymer mold or between the polymer mold and the carrier.

21 Claims, 5 Drawing Sheets

Related U.S. Application Data

(60) Provisional application No. 61/665,625, filed on Jun. 28, 2012.

(51) Int. Cl.
| | |
|---|---|
| *B29C 33/38* | (2006.01) |
| *B29C 45/14* | (2006.01) |
| *B29C 67/24* | (2006.01) |
| *B29C 39/10* | (2006.01) |
| B29L 31/30 | (2006.01) |
| B29K 63/00 | (2006.01) |

(52) U.S. Cl.
 CPC ............ *B29C 45/14* (2013.01); *B29C 67/246* (2013.01); *B29K 2063/00* (2013.01); *B29L 2031/30* (2013.01); *B29L 2031/3002* (2013.01)

(58) Field of Classification Search
 CPC ............ B29K 2063/00; B29L 2031/30; B29L 2031/3002
 See application file for complete search history.

(56) References Cited

U.S. PATENT DOCUMENTS

| | | |
|---|---|---|
| 6,573,309 B1 | 6/2003 | Reitenbach et al. |
| 6,808,668 B2 | 10/2004 | Bhatt et al. |
| 6,986,855 B1 | 1/2006 | Hood et al. |
| 2001/0047055 A1* | 11/2001 | Takeuchi .............. C08F 297/02 525/88 |

FOREIGN PATENT DOCUMENTS

| | | |
|---|---|---|
| EP | 1163288 B1 | 5/2003 |
| GB | 2147244 A | 5/1985 |
| JP | 2011079324 A | 4/2011 |
| JP | 2011121305 A | 6/2011 |
| WO | 2006055815 A2 | 5/2006 |
| WO | 2010053142 A1 | 5/2010 |

OTHER PUBLICATIONS

International Search Report for PCT/US2013/048526, dated Sep. 25, 2013, 1 page.
Supplementary European Search Report for EP 13 81 0750 dated Jan. 21, 2016, 2 pages.

* cited by examiner

METHOD OF MANUFACTURING A COMPOSITE INSERT BY MOLDING

BACKGROUND OF THE INVENTION

1. Field of the Invention

A method of manufacturing a composite insert, useful as a structural and/or acoustic insert in a vehicle, as well as a method of manufacturing a composite part including the composite insert and a carrier, and inserts, parts and pre-packaged inserts and parts, made by these processes.

2. Description of the Prior Art

Traditional structural and acoustic inserts are manufactured from solid reactive compositions under high temperature and high pressure via injection molding or extrusion conditions. These prior art conditions require significant time and process control monitoring during manufacturing to maintain optimum equipment operating conditions and product quality. For example, since high temperature conditions are used, the temperatures of the equipment and the composition must be closely monitored to keep the reactive composition below its cure temperature. Due to the high heat input needed to make prior art solid compositions moldable or extrudable, the molded or extruded insert must be given a significant period of time to cool after forming to reduce damage and/or deformation of the insert during removal from a mold or other handling; this leads to increased cycle times. The pressure of injection is typically high, meaning in the range of 400 bar up to 1000 bar. Since high pressures are used, the molds, dies and other equipment used to injection mold or extrude under these conditions can be expensive. Carriers used in the molding process must also be designed to withstand these high pressures. After forming, the high pressure injection molded parts must be demolded, while extruded strips are typically cut into inserts. The prior art inserts and parts then go through the additional step of individual packaging, after which they are shipped, unpackaged and eventually placed in a vehicle at a final assembly location.

Since extruded parts start out as strips of extruded material and must be cut to size, another drawback of extruded parts is the limited geometry available. Due to the nature of the extrusion process, which produces a strip by passing material through a die, the resulting part has geometries available in the x, y planes, but very limited geometry in the z-plane where the strip is divided into lengths to form the parts.

SUMMARY OF THE INVENTION

The subject invention provides a method of making a composite insert, as well as a method of making a composite part including the composite insert and a carrier, under low pressure and low temperature injection molding or dispensing conditions of a composite insert composition into a polymer mold having a glass transition temperature that is higher than a maximum temperature of the composite insert composition injection molding or dispensing, desirably at least 5° C. higher than said temperature.

In one embodiment of manufacturing a composite part, the method may include forming a polymer mold for a composite insert from a polymer having a glass transition temperature of 40 to 250° C., desirably 70 to 160° C., the polymer mold and a carrier forming a cavity disposed between the polymer mold and the carrier, optionally the polymer mold is fitted about the carrier.

In either embodiment, the method proceeds by dispensing a composite insert composition into a cavity under low temperature 15-100° C. and low pressure of zero to 10 bar, conditions, and then allowing the composition to become dimensionally stable. If a composite part is being manufactured, the composition is allowed to become dimensionally stable about the carrier to create the composite insert, at least a portion of which is disposed between the polymer mold and the carrier. If only a composite insert is being manufactured, the composition is allowed to become dimensionally stable within the polymer mold to create the composite insert disposed within the cavity of the polymer mold.

In one embodiment of the method, the composite insert composition is a liquid two-component composition including a first component comprised of an isocyanate-epoxy blend and a second component comprised of an alcohol epoxy, and after low pressure injection, the liquid composition forms a polyurethane network, desirably having some cross-linkages, which provides for a solid, dimensionally stable, composite insert either within the polymer mold or adhered to the carrier.

The composite insert is dimensionally stable, but is not fully cured after manufacture. A second curing stage, typically in a production step for a vehicle or other article of manufacture utilizing the composite insert or part, such as a paint or other bake cycle, causes full cure of the composite insert composition. Desirably, full cure may result from epoxy reactions and the like. The final cure results in a cured composite section adhered to any optional carrier as well as surfaces of the vehicle or other article of manufacture utilizing the composite insert or part.

The subject method of manufacturing a composite insert significantly reduces the overall process cost, including cost for batch manufacturing, machinery and mold, as well as the development time required for production parts. In addition, by creating a composite part by over-molding the composite insert onto a carrier, manual processes for example fixing an insert to a carrier are eliminated at the final assembly locations. Further, the polymer mold can provide packaging and shipping advantages, since the polymer mold can remain on the composite insert until immediately prior to final assembly, thereby forming a pre-packaged composite insert or composite part. In the present specification and claims, when a numerical range is provided, it is intended that the range comprises all sub-ranges found within the stated range.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
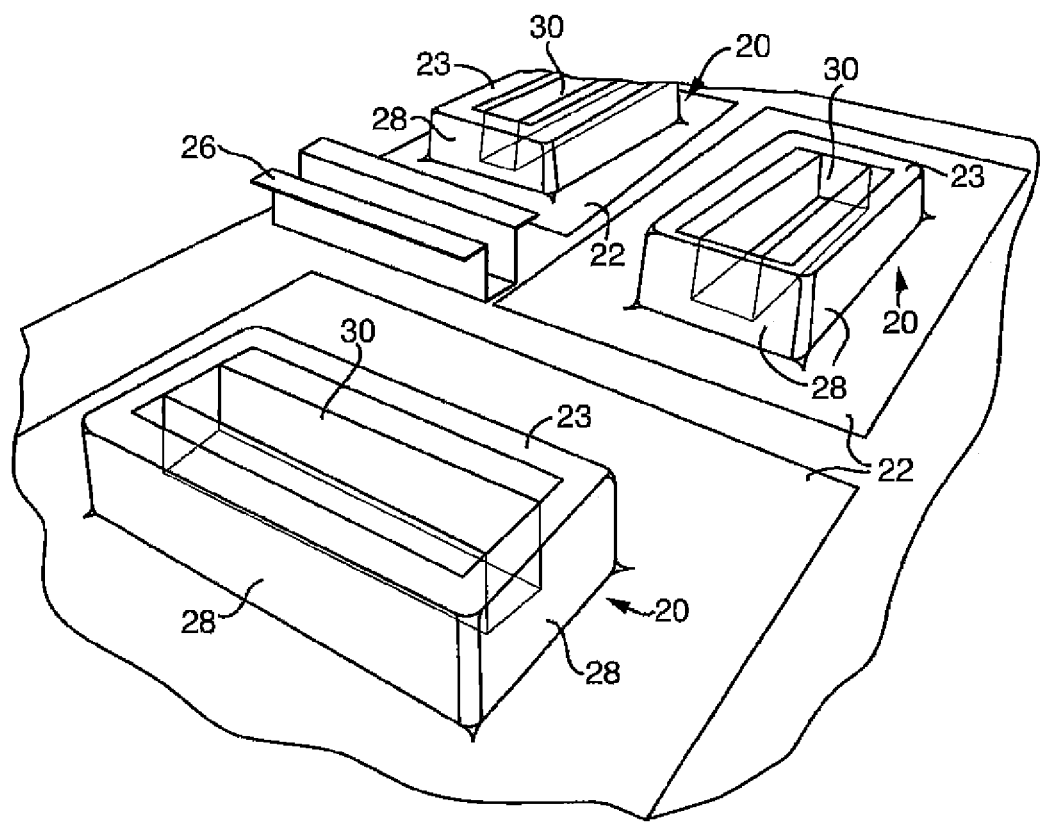
FIG. 1 is a perspective view of three a polymer molds and one carrier for use with one embodiment of subject method.

Referring to the Figures, wherein like numerals indicate corresponding parts throughout the several views, a method of manufacturing a composite insert, as well as a method of manufacturing a composite part including the composite insert and a carrier joined together, first includes a step of obtaining, forming or having formed (hereinafter referred to collectively as "forming") a polymer mold 20 for use in manufacturing the composite insert. One example of a polymer mold 20 that may result from such a forming step is generally shown in FIG. 1. The polymer mold 20 of the embodiment shown in FIG. 1 comprises a cavity 30 for accepting a composite insert composition dispensed as a flowable or low pressure injectable material. Cavity 30 terminates at flange surfaces 23, which surround the cavity and extend outward therefrom. In this embodiment, the polymer mold 20 has external walls 28 and is self supporting.

The polymer mold 20 shown in FIG. 1 is only a generic embodiment of the polymer mold according to the invention, and is simply used for purposes of illustrating the subject method. In addition, although the polymer mold 20 is illustrated as a singular mold being open on one end, the polymer mold 20 may also include two or more polymer mold portions which join or are joined together to form polymer mold 20, optionally creating a closed or closable mold. Where the polymer mold 20 is an open mold, a composite insert may be formed by dispensing a composite insert composition into the cavity 30 and allowing the composition to become dimensionally stable. The ultimate design and shape of the polymer mold 20 will depend on the desired shape of the composite insert or the design and shape of the carrier with which the composite insert will be utilized. In addition, the design and shape of the polymer mold 20 will take into consideration any performance properties that the composite insert will be required to have once manufactured or attached to the carrier, and those required in use, such as structural reinforcement and/or vibration or acoustic abatement.

Carriers suitable for use in the invention include by way of non-limiting example, carriers for use in a structural component of a vehicle, such as an A-pillar, A-pillar reinforcement, B-pillar, B-pillar reinforcement, C-pillar, C-pillar reinforcement, rocker, rocker reinforcement, roof-rail, roof-rail reinforcement or the like. In these examples, the carrier often is comprised of steel or aluminum and the performance properties of the composite insert include the contribution of improved structural and/or acoustic performance to the structural component. The method of manufacturing the composite insert is not limited to these automotive structural components or even the two mentioned materials of the carrier. Rather, the method can be used to manufacture composite inserts for use with carriers of a variety of shapes and designs, and which can also be comprised of a variety of other materials such as carbon fiber, fiberglass, plastics, other metals, ceramics, anisotropic materials such as wood or fiber reinforced composites, paperboard and the like.

Figure 2:
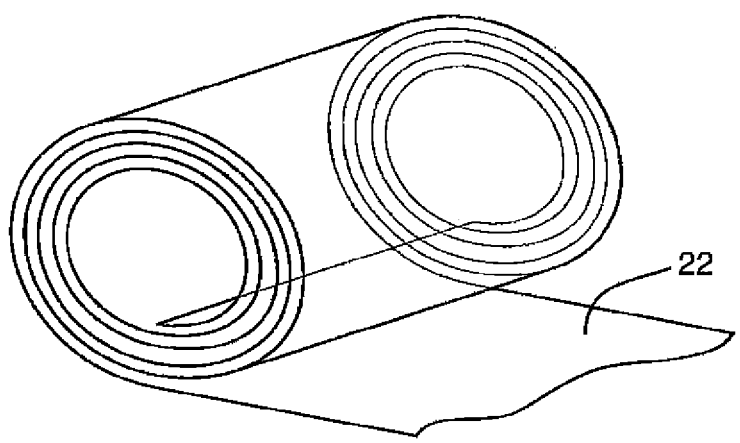
FIG. 2 is a perspective view of a polymer sheet used to form a polymer mold according to the invention.

As shown in FIG. 2, the polymer mold 20 can be formed from a polymer sheet 22, comprised of an organic or inorganic polymer having a glass transition temperature that is higher than a maximum injection molding or dispensing temperature of the composite insert composition, desirably at least 5, 10, 15, 20, 25 or 30° C. higher than said temperature. The polymer comprising the polymer sheet 22 may be selected such that the difference between the polymer Tg and the maximum injection molding or dispensing temperature is greater than the above-mentioned temperature differences, provided that higher temperatures or pressures required to form the polymer sheet 22 into the polymer mold 20 do not unduly interfere with the objects of the invention.

Desirably, the polymer mold 20 may be comprised of an organic polymer having a glass transition temperature, in increasing order of preference, of at least 40, 45, 50, 55, 60, 65, 70, 75, 80, 85° C. and independently not more than 250, 200, 150, 100, 95, 90° C. In one embodiment, the method includes forming a polymer mold having a cavity from polymer having a glass transition temperature between 70 and 100° C. Organic polymer is intended to include homopolymers and co-polymers, random, block and tailed. One embodiment of the polymer sheet 22 comprises a polyester film, such as Mylar®, however any other suitable polymer sheets can be used to form the polymer mold 20, such as polyethylene terephtalate (PET), isotactic polypropylene (PP) or the like. The polymer sheet 22 is desirably insoluble in and not reactive with the composite insert composition at dispensing temperature.

Figure 3:
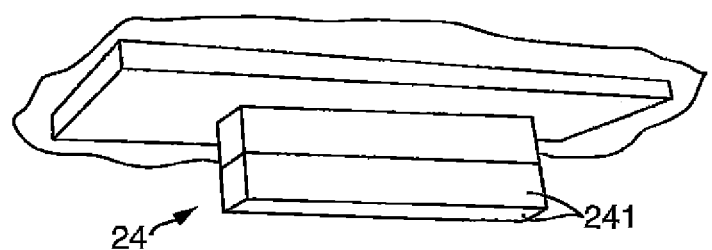
FIG. 3 is a perspective view of a male, in this case metal covered, form used in one of the embodiments of the invention to form a polymer sheet into a polymer mold.
Figure 4:
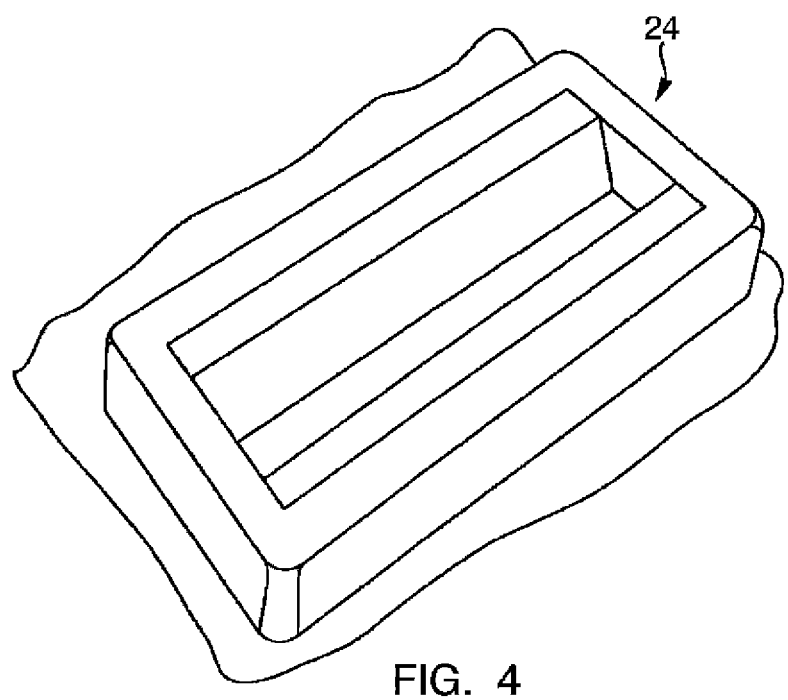
FIG. 4 is a perspective view of a female, in this case metal, form used in one of the embodiments of the invention to form a polymer sheet into a polymer mold.

As shown in FIGS. 3 and 4, in one embodiment a polymer mold 20 can be formed by heat pressing a polymer sheet 22 between two forms 24, having metal surfaces, such that the polymer sheet 22 reaches its glass transition temperature $T_g$. The surfaces 241 of the forms 24 provide geometries to the polymeric mold 20 which in turn at least partially provide shape to the composite inserts made from the polymer mold 20. The material comprising forms 24 is not particularly limited, provided that it is non-reactive with the polymer sheet 22 and sufficiently durable to withstand the forming temperatures and pressures to change the polymer sheet 22 into the desired shape of the polymer mold 20. Optionally, the forms are heated to the Tg of the polymer sheet 22. The polymer mold 20 can also be formed by a variety of other suitable methods such as vacuum forming, blow molding, thermoforming, clam shell molding and the like.

Figure 5:
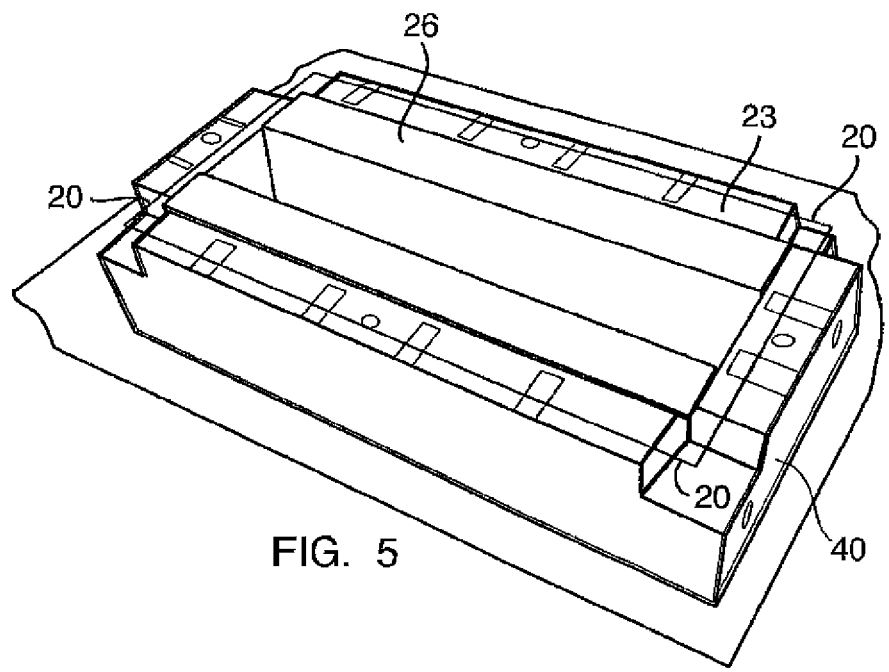
FIG. 5 is a perspective view of a carrier supported in a polymer mold and further supported by a die.
Figure 6:
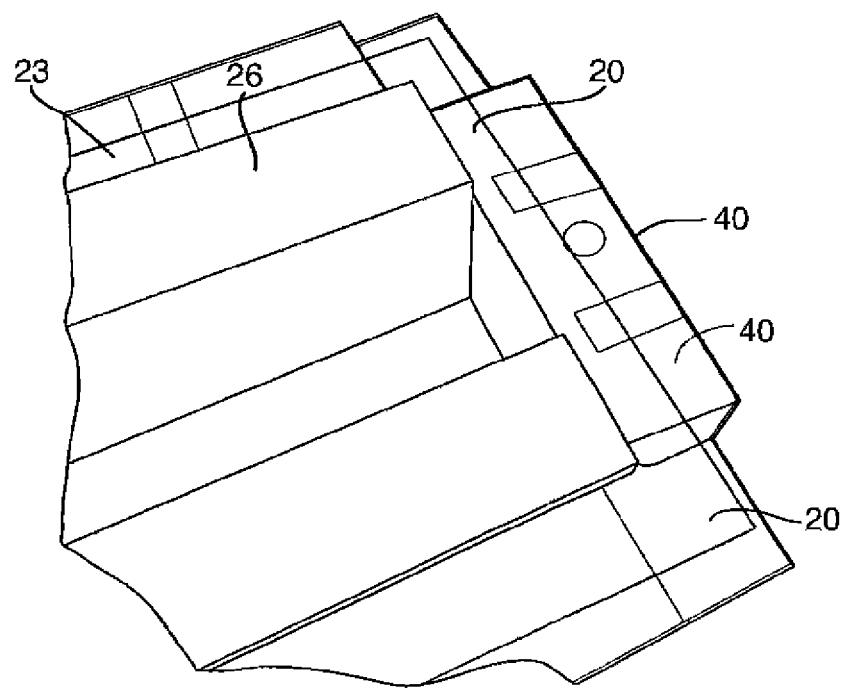
FIG. 6 is a magnified perspective view of a portion of FIG. 5.
Figure 7A:
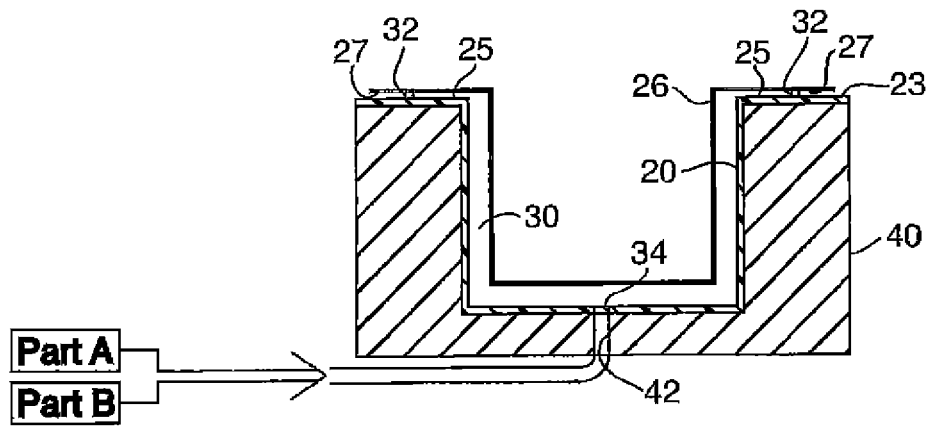
FIG. 7a is a cross-sectional view of the die, carrier and polymer mold of FIG. 5 to illustrate a cavity between the carrier and polymer mold.

As shown in FIG. 5, in an embodiment where a composite part is manufactured, the method proceeds by providing a carrier 26 on which a composite insert is to be adhered, and joining the polymer mold 20 and the carrier 26 thereby forming a cavity 30 therebetween. Optionally, the polymer mold 20 surrounds the carrier 26. As will be discussed in greater detail, in certain embodiments where the composite insert is only desired to adhere or attach to a portion of the carrier 26, the polymer mold 20 would only surround that portion of the carrier 26 for which the composite insert is desired. Also, similar to the polymer mold 20 discussed above, the carrier 26 as shown in the Figures is simply a generic embodiment and illustrates a generic U-shaped metal carrier, which corresponds to the shape of the generic embodiment of the polymer mold 20, described above. The carrier 26 that will ultimately be utilized with the subject method is the carrier 26 on which it is desired to adhere the composite insert. As shown in FIGS. 5 and 7a, the carrier 26 can sit at least partially inside the polymer mold 20 which can further be supported by a die 40. The optional die 40 can be advantageous because the die 40 can support the mold 20 and carrier 26 during the ensuing steps of the method and thus reduce pressure on the polymer mold 20 enabling use of thinner polymer sheets and molds, and avoid deformations in the composite insert that is ultimately manufactured. However, the die 40 is optional and not required to perform the subject method. An advantage of the invention is that due to the lower pressures and temperatures of processing, dies useful in this embodiment need not meet specifications for high pressure and for high temperature injection molding. Dies useful in the invention need only be thick enough to undergo dispensing pressures and temperatures of the described method in the absence of die deformation. Suitable die materials can include rigid polymers, wood, composites and metal, such as steel or aluminum. The dies may also be modular structures. Another benefit of low pressure injection molding is that the low pressures allow introducing reinforcing or other solid materials into the cavity at selected positions, which then produce composite inserts comprising the solid materials at selected locations in the insert that substantially contribute to the overall performance of the insert. High pressure injection molding typically forces any solids or fibers out of position due to the pressure exerted to fill the mold. In Applicants' invention, pressures can be selected such that prior to or during the dispensing step, an operation of positioning insert reinforcing material, which is different from the carrier and/or the composite insert composition, in the cavity at one or more selected cavity positions, can be performed such that said insert reinforcing material is incorporated into the solid composite insert at insert positions, that is locations in the insert, corresponding to the one or more selected cavity positions.

Figure 7B:
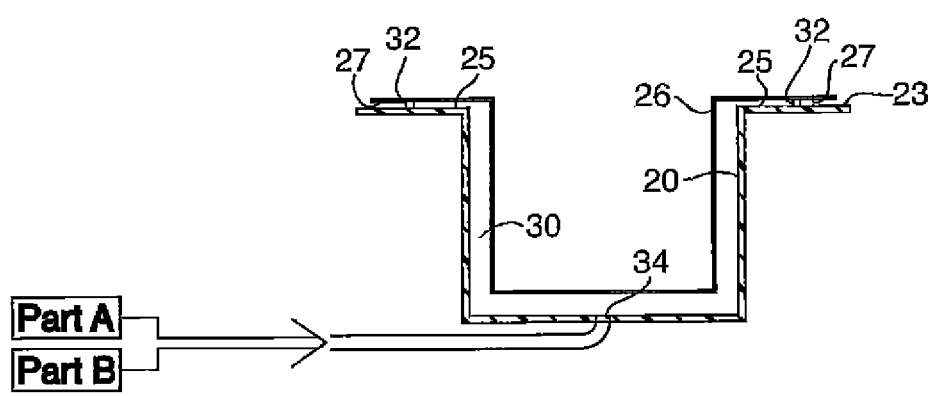
FIG. 7b is a cross-sectional view of another embodiment of the invention similar to FIG. 7a, wherein the optional die is not used during dispensing of the composition into the polymer mold.

As shown in FIG. 7b, in an embodiment where a composite part is manufactured, a polymer mold 20 and a carrier 26 are joined such that the polymer mold 20 forms a cavity 30 between the polymer mold 20 and the carrier 26. In this embodiment, flange surfaces 23 comprise interference surfaces 25 for contacting corresponding carrier flange surfaces 27 on carrier 26. The method can include fastening the polymer mold 20 to the carrier 26 using attachments 32 such as by way of non-limiting example: fasteners, tabs, clips, pins, weld tabs and the like, as well as stand-alone features provided in the structure of the polymer mold 20 and/or the carrier 26, e.g. ridges, mating surfaces out of the plane of the flanges of the mold and carrier, such as detents. The attachment 32 can simply comprise a surface interference fit between the polymer mold 20 and the carrier 26. In any of these embodiments, the attachment 32 is used to create a liquid-tight seal of the cavity 30 between the polymer mold 20 and the carrier 26. While it is possible to provide a liquid-tight seal that can allow air to escape out of the cavity 30 during the ensuing steps of dispensing or injecting a composite insert composition into the cavity 30, it is desirable that air is evacuated out of the mold only at selected locations, in increasing order of preference not more than 10, 8, 6, 4, 2, 1 evacuation site(s) in the mold 20.

Also, where a composite insert is only desired to adhere or attach to a portion of the carrier 26, the seal defines limits or boundaries of the composite insert. For example, a polymer mold 20 can surround a portion of the carrier 26 on which a composite insert is desired, and in ensuing dispensing or injection steps, a composite insert composition would only flow and form an insert body up to the seal. Accordingly, through use of the polymer mold 20 and the attachments 32, the method can provide for forming a composite insert on only a portion of the carrier 26.

As mentioned previously, in one embodiment of the method, only a composite insert is manufactured and thus use of a carrier 26 is not required. Rather, in this embodiment, the polymer mold 20 may be formed to create an open cavity into which a composite insert composition is dispensed or injected at low pressures. Alternatively, the polymer mold 20 may be formed such that the cavity 30 is surrounded by the polymer mold 20 thereby defining a closed cavity. The cavity 30 may be formed by joining two opposing polymer molds 20 together, or the polymer mold 20 and thus the cavity 30 could be formed by a variety of other suitable methods such as vacuum forming, blow molding, thermoforming, clam shell molding and the like.

Whether generating a composite insert or a composite part, the method proceeds by dispensing or injecting a composite insert composition into the cavity 30, preferably under lower pressure conditions of between 0-10 bar and low temperature conditions of between 15-100° C., desirably 25-80° C. In an embodiment of the method, the cavity 30 can be pre-treated with a pre-curing media such as cooled or heated air, water, or other temperature controlled environment conditions prior to dispensing or injection of the a composite insert composition, however this step is not required to perform the subject invention. In a preferred embodiment, the composite insert composition is a liquid at ambient temperatures, desirably at temperatures of about 10, 15, 20, 25 or 30° C. and can be dispensed at ambient temperature. Some composite insert compositions may optionally be warmed to dispensing temperature conditions as described herein prior to being introduced into the cavity 30; however dispensing temperature is less than a full cure temperature of the composite insert composition.

Generally, whether liquid or solid at room temperature, the composite insert composition can be dispensed in the absence of the high temperature and high pressure conditions associated with the prior art injection molding processes of a solid composite insert composition.

In one preferred embodiment, the composite insert composition is a two-component liquid composition, and thus the method includes pre-mixing the two components using a static or dynamic mixing element, shown diagrammatically in FIGS. 7a & 7b as "Part A" and "Part B", prior to dispensing or injecting the composite insert composition into the cavity 30. One example of a suitable two-component composite insert composition includes a first component comprised of an isocyanate-epoxy blend and a second component comprised of an alcohol-epoxy blend. In a preferred embodiment, the liquid two-component composition is comprised of a 25% epoxy resin. In addition, there is a large variety of modified liquid epoxy resins which are available in the market and which can be used with the subject invention, for example toughened epoxy, rubber modified, acrylic modified, liquid epoxy modifiers, and the like. Other suitable single component or two-component compositions may be used provided that the composition is usable with the polymeric mold and molding process as described herein.

The step of dispensing or injecting the composite insert composition may include creating an injection hole 34 in the polymer mold 20 to provide access to the cavity 30 and injecting or dispensing the composite insert composition through the injection hole 34 and into the cavity 30. Where optional die 40 is used, the composition may be introduced to injection hole 34 via die passage 42. As mentioned previously, during injection of a composite insert composition into a cavity 30, although the attachments 32 create a liquid tight seal between the polymer mold 20 and the carrier 26, air is allowed to escape from the cavity 30 via air evacuation sites as the composition is introduced. In the embodiment where a carrier 26 is not used, the step of injecting or dispensing the composite insert composition also includes creating at least one vent hole 35 in the polymer mold 20 for allowing air to escape out of the cavity 30, e.g. rise, as the composition is introduced, unless the polymer mold 20 is an open cavity mold as described herein. While the injection hole 34 can be located at any position along the polymer mold 20, it is desirably positioned at the bottom of the polymer mold 20. Correspondingly, the vent hole 35 is desirably positioned opposite the injection hole 34 to allow the air to effectively rise and escape from the cavity 30 of the polymer mold 20. In one embodiment, an active air evacuation step can also be used to remove air from the cavity, but this step is not required to perform the subject method.

Figure 8:
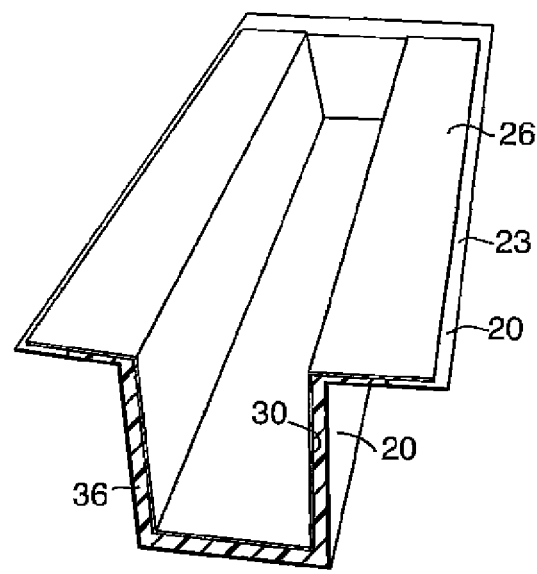
FIG. 8 is a perspective view of a partial section of a dimensionally stable composite part according to the invention comprising a composite insert and a carrier wherein the insert is disposed between a polymer mold and the carrier, and a portion of the insert and polymer mold are cut away to show positioning of the insert.

After injecting or dispensing the composition into the cavity 30, the injection hole 34, and optionally the vent hole 35 where used, in the polymer mold 20 may be sealed using suitable methods and devices to isolate the composite insert composition within the cavity 30 and thus limit the composition either within the polymer mold 20 or between the polymer mold 20 and the carrier 26. Suitable methods and devices to isolate the composite insert composition within the cavity 30 include, by way of non-limiting example, adhesive tape, sealant, plugs, welding, ultrasonic energy, adhesive compositions or the like. The method proceeds by allowing the composite insert composition to become dimensionally stable. In the embodiment where a composite part is manufactured, the composite insert composition adheres to the carrier 26 and creates a solid composite insert 36 disposed between the polymer mold 20 and the carrier 26, as shown in FIG. 8, thereby forming composite part 38, comprising the solid composite insert 36 and the carrier 26. Alternatively, if only the composite insert is being manufactured, the composition is allowed to become dimensionally stable within the polymer mold 20 to create the composite insert 36 disposed within the cavity 30 of the polymer mold 20.

When the composite insert composition is injected under low temperature conditions as described herein, the step of allowing the composite insert composition to become dimensionally stable includes cooling the injected composition for a predetermined residence time of between 0 to 600 seconds, desirably the cooling time is at least 1, 5, 10, 20, 30, or 45 seconds and independently is not more than 600, 550, 500, 450, 400, 350 300, 240, 200, 180, 150, 120, 100, 90 or 60 seconds. When a two-component liquid composition is injected under low temperature conditions, the step of allowing the composite insert composition to become dimensionally stable includes allowing the first and second components to react, and optionally cooling the injected composition, for a predetermined residence time as described above. For example, in one embodiment using polyurethane chemistries, the isocyanate of the first component reacts with the alcohol of the second component to create a cross linked polyurethane network that produces a solid, dimensionally stable, composite insert. A short residence time after the injecting or dispensing step provides the composite insert composition with sufficient time to solidify and form a solid composite.

The solid composite insert is dimensionally stable, but is not fully cured after manufacture. A second curing step, typically in a production step for a vehicle or other article of manufacture utilizing the composite insert or part, such as a paint or other bake cycle, causes full cure of the composite insert composition. Desirably, full cure may result from epoxy reactions and the like. The full cure results in a cured composite section adhered to any optional carrier as well as to surfaces of a vehicle or other article of manufacture utilizing the composite insert or part.

Figure 9:
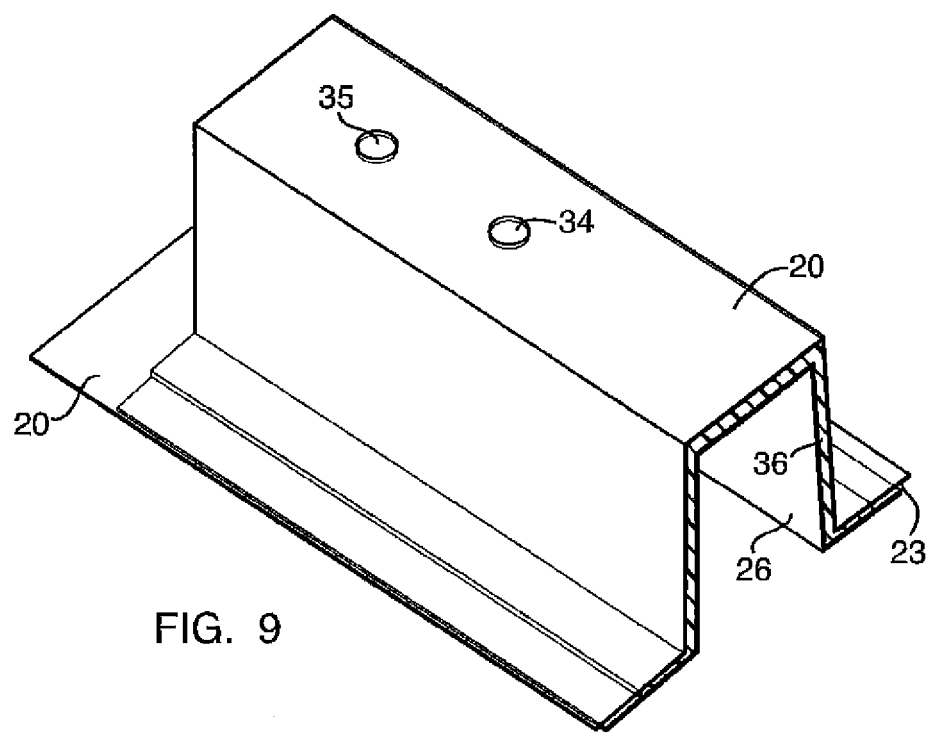
FIG. 9 is a perspective view of the composite part of FIG. 8, rotated 180 degrees around its longitudinal axis, showing the polymer mold and carrier surrounding the composite insert.

After the composite insert 36 is manufactured, the polymer mold 20 can be removed, and optionally reused or recycled; or can remain on the composite insert 36, as shown in FIG. 9, thereby forming a pre-packaged composite insert or composite part. In the pre-packaged composite insert or composite part, the polymer mold 20 remains covering at least a portion of the composite insert and acts as an external protective covering for the composite insert 36 during subsequent storage or shipping. Benefits of pre-packaging include that the polymer mold 20 can prevent debris or other materials from adhering to surfaces of the composite insert after manufacture, allow easier handling of these inserts, as well as facilitate improved shipping arrangements such as stacking of the parts and the like. Also, the interaction between the polymer mold 20 and the composite insert 36 is such that the polymer mold 20 can be manually removed either shortly after forming, or just prior to assembly of the carrier 26. In either situation, the removal of the polymer mold 20 ultimately presents the composite part which includes the composite insert 36 already adhered to the carrier 26. Also, where the polymer mold 20 is desired to be removed shortly after forming of the composite insert 36, the polymer mold 20 can be re-used for the forming of subsequent composite inserts 36 with other carriers 26.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A method of manufacturing a composite insert comprising the steps of:
   obtaining a polymer mold for a composite insert, said polymer mold comprising a polymer having a glass transition temperature;
   joining the polymer mold and a carrier thereby forming a cavity disposed between the polymer mold and the carrier;

dispensing a liquid composite insert composition, having a full cure temperature, into the cavity at a selected dispensing temperature that is less than the full cure temperature; and allowing the composition to become dimensionally stable about the carrier thereby forming a solid composite insert disposed between the polymer mold and the carrier;

wherein the glass transition temperature of the polymer forming the polymer mold is greater than or equal to the selected dispensing temperature and the composite insert is not fully cured until after the polymer mold is removed from the composite insert.

2. The method as set forth in claim 1 wherein said step of obtaining a polymer mold includes placing a polymer sheet comprised of the polymer between two forms and contacting the polymer sheet with the two forms such that the polymer sheet is heated at least to the glass transition temperature of the polymer to create the polymer mold.

3. The method as set forth in claim 1 wherein said step of dispensing the composite insert composition includes injecting the composite insert composition into the cavity under pressure conditions between 0-10 bar and the selected dispensing temperature of between 15-100° C.

4. The method as set forth in claim 3 wherein said step of injecting the composite insert composition includes mixing a two-component composite insert composition including a first component comprised of an isocyanate-epoxy blend and a second component comprised of an alcohol-epoxy.

5. The method as set forth in claim 4 wherein the step of allowing the composite insert composition to become dimensionally stable includes allowing the first and second components to react, and optionally cooling the injected composition, for a predetermined residence time of between 0 to 600 seconds to create a polyurethane network of the composite insert.

6. The method as set forth in claim 1 wherein the glass transition temperature of the polymer is in a range of 40 to 250° C.; and the polymer is selected from the group consisting of polyesters, polyethylene terephthalate, isotactic polypropylene and combinations thereof.

7. The method as set forth in claim 1 further comprising the step of fastening the polymer mold to the carrier using an attachment to create a liquid-tight seal of the cavity between the polymer mold and the carrier.

8. The method as set forth in claim 7 wherein said step of fastening the polymer mold includes establishing a surface interference fit between the polymer mold and the carrier.

9. The method as set forth in claim 8 wherein the carrier is a structural component of a vehicle.

10. The method as set forth in claim 9 further comprising the steps of removing the polymer mold from the structural component of the vehicle and the composite insert adhered to said structural component, thereby presenting a composite part.

11. A method of manufacturing a composite part including a composite insert adhered to a carrier, said method comprising the steps of:

obtaining a carrier to receive a composite insert;

joining a polymer mold and the carrier thereby forming a cavity disposed between the polymer mold and the carrier;

dispensing a liquid composite insert composition into the cavity at a selected dispensing temperature; and allowing the composition to become dimensionally stable about the carrier thereby forming a composite part including a solid composite insert, wherein the composite insert composition is not fully cured after manufacture of the composite part and requires a second curing stage in a step of utilizing the composite part after removal from the mold, said solid composite insert being adhered to the carrier;

wherein the glass transition temperature of polymer forming the polymer mold is at least 5° C. higher than the selected dispensing temperature.

12. The method as set forth in claim 11 wherein the step of dispensing the composite insert composition includes injecting the composite insert composition into the cavity under pressure conditions between 0-10 bar and the selected dispensing temperature of between 15-100° C.

13. The method as set forth in claim 12 further comprising steps of:

mixing a two-component composition including a first component comprised of an isocyanate-epoxy blend and second component comprised of an alcohol-epoxy blend to form the composite insert composition; and after the dispensing step, allowing the first and second components of the composite insert composition to react, and optionally cooling the composite insert composition, for a predetermined residence time of between 0 to 600 seconds to create a polyurethane network of the composite insert.

14. The method as set forth in claim 11 further comprising the steps of:

fastening the polymer mold to the carrier using an attachment to create a liquid-tight seal of the cavity between the polymer mold and the carrier.

15. The method as set forth in claim 11 further comprising the step of removing the polymer mold from the composite insert to present the composite part including the composite insert adhered to the carrier.

16. The method as set forth in claim 11 wherein the carrier is a structural component for a vehicle.

17. The method as set forth in claim 11 further comprising prior to or during the dispensing step, a step of positioning insert reinforcing material, which is different from the carrier or the composite insert composition, in the cavity at one or more selected cavity positions, such that said insert reinforcing material is incorporated into the solid composite insert at insert positions corresponding to the one or more selected cavity positions.

18. A method of manufacturing a composite insert comprising the steps of:

forming a polymer mold having a cavity from a polymer having a glass transition temperature;

dispensing a composite insert composition into the cavity at a selected dispensing temperature, which is less than a cure temperature of the composite insert composition; and allowing the composition to become dimensionally stable to create a composite insert disposed within the polymer mold; and keeping the composition below its full cure temperature during manufacturing of the composite insert such that a second cure step during use of the composite insert after removal from the mold can cause full cure of the composite insert composition; and wherein the glass transition temperature of the polymer forming the polymer mold is greater than or equal to the selected dispensing temperature and the composite insert is not fully cured in the polymer mold.

19. The method as set forth in claim 18 wherein said step of dispensing the composite insert composition includes injecting the composite insert composition into the cavity under lower pressure conditions between 0-10 bar and low temperature conditions between 15-100° C.

20. The method as set forth in claim 18 further comprising prior to or during the dispensing step, a step of positioning insert reinforcing material, which is different from the composite insert composition, in the cavity at one or more selected cavity positions, such that said insert reinforcing material is incorporated into the solid composite insert at insert positions corresponding to the one or more selected cavity positions.

21. The method as set forth in claim 18 wherein said step of obtaining a polymer mold includes placing a polymer sheet comprised of the polymer between two forms and contacting the polymer sheet with the two forms such that the polymer sheet is heated at least to the glass transition temperature of the polymer to create the polymer mold.

* * * * *